UNITED STATES PATENT OFFICE.

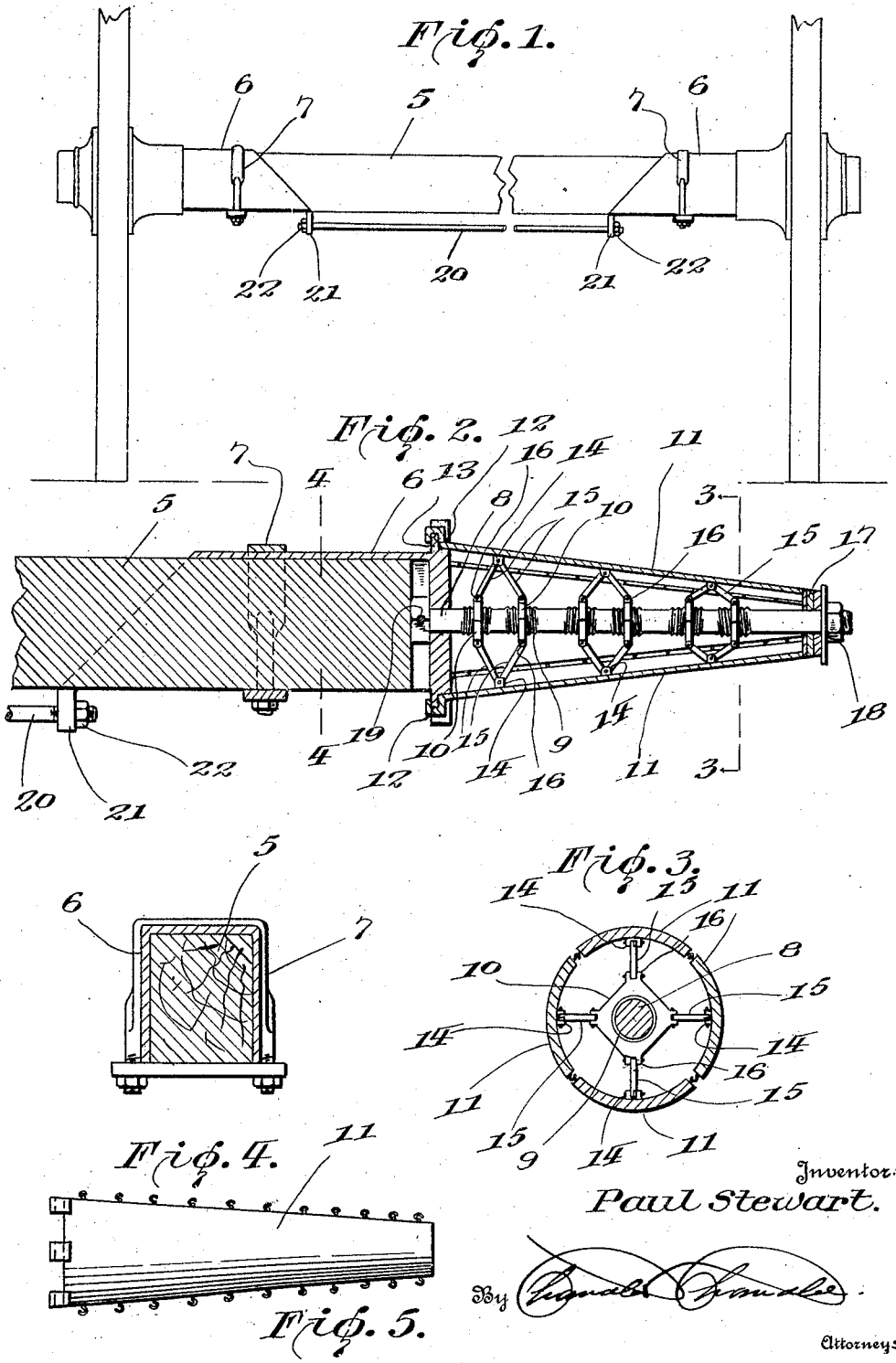

PAUL STEWART, OF MANVILLE, WYOMING.

ADJUSTABLE WAGON-SKEIN.

1,400,385. Specification of Letters Patent. Patented Dec. 13, 1921.

Application filed March 28, 1921. Serial No. 456,235.

*To all whom it may concern:*

Be it known that I, PAUL STEWART, a citizen of the United States, residing at Manville, in the county of Niobrara, State of Wyoming, have invented certain new and useful Improvements in Adjustable Wagon-Skeins; and I do hereby declare the following to be a full, clear, and exact description of the invention, such as will enable others skilled in the art to which it appertains to make and use the same.

This invention relates to skeins for use upon wagons, the primary object of the invention being to provide means of an improved nature for the support of the wheels of the wagon which may be readily adjusted or adapted to boxings of wheels of various sizes and tapers within certain limits, as well as worn boxings, which is strong and durable in use, which may be readily applied and rigidly supported upon the wagon axle, and wherein any required adjustment or expansion of the skein may be readily made.

With these objects in view, together with others which will appear as the description proceeds, the invention resides in the novel construction, combination and arrangement of parts, all as will be described more fully hereinafter, illustrated in the drawings, and particularly pointed out in the claims.

In the drawings:

Figure 1 is a rear elevation of a conventional form of axle tree of a vehicle, and illustrating the application of a skein constructed in accordance with my invention.

Fig. 2 is an enlarged longitudinal sectional view taken through one of the skeins.

Fig. 3 is a transverse sectional view taken substantially upon line 3—3 of Fig. 2, and Fig. 4 is a sectional view taken upon line 4—4 of Fig. 2.

Fig. 5 is a plan view showing one of the skein members.

Referring now more particularly to the drawings, the axle tree of the wagon is indicated at 5 the same being of rectangular shape as is customary.

The improved skein includes a body 6 formed of suitable metal, of rectangular shape in cross section, being hollow and of such size as to fit snugly and securely upon the ends of the tree, 5. To assist in firmly retaining this body upon the tree, a U-bolt 7 couples the said body and tree, being passed around the same and secured rigidly thereto by means of the bolts and connecting plate, as shown. The outer end of the body 6 is provided with a central opening to receive the headed end of a bolt indicated at 8. This bolt is firmly seated at its inner end within the said body and must necessarily be strong to withstand the strains to which it must be subjected. This bolt 8 is provided with threads 9 to receive nuts 10 arranged in spaced relation upon said bolt. The frame which is to constitute the spindle for the accommodation of the wagon wheel comprises a plurality of elongated plates indicated at 11. These plates are sufficiently long to extend through or substantially through the hub of the wheel, and may be narrow if desired and of arcuate shape in cross section to adapt themselves to the boxing of the wagon wheel. The inner ends of these plates are grooved as at 12 to rest upon the outwardly projecting annular flange 13 on the outer end of the body 6. In the present instance the frame is constructed of four of these plates, disposed 90° from each other, but it will be understood that more or less of said plates may be employed as required.

The inner faces of the plates 11 are provided with lugs indicated at 14 to secure the outer ends of arms 15 carried by the nuts 10. The nuts 10, as shown, are provided with offset portions 16 having openings therein and through which the inner ends of the arms 15 pass. The nuts 10 are arranged in pairs in spaced relation longitudinally of bolt 8, and the arms 15 of each pair extend outwardly therefrom in convergent relation and are attached to the adjacent portion of the plates 11. It will be understood that the outwardly extending portions 16 of the nuts correspond in number to the plates 11, and that arms 15 in sufficient number to establish connection between the various plates and portions 16 will be employed. It is obvious therefore, that when the adjustable nuts are connected with the various plates 11 constituting the spindle frame, adjustment of the nuts longitudinally upon the bolt 8 will increase or diminish the diameter of the skein, depending upon the direction in which the bolts are adjusted.

A series of washers or nuts 17 are provided for the outer extremity of bolt 8, the said washers varying in size and being properly graduated and having their peripheral edges beveled as shown. These washers or nuts are held in proper assembled position upon the bolt 8 by nut 18. It will be understood that the beveled washers will be changed to correspond to the increased or diminished diameter of the skein.

To assist in maintaining the bolt 8 in proper position within the body 6, a pin 19 is driven therethrough, the said pin locking the said bolt against movement in any direction within the end of the body. When it is desired to adjust the skein, the nuts 17 are loosened, the pin 19 is withdrawn, and through the medium of a wrench engaged with the head of the bolt 8, the bolt is rotated in one direction or the other to adjust the nuts and correspondingly adjust the plates 11, after which the pin 19 is returned and the nut 17 tightened up.

In practice, a skein as above constructed, is applied to each end of the axle tree 5, and a tie rod 20 passing beneath the said axle tree connects the inner or adjacent ends of the body. The said inner ends of the body are provided with downturned lips or projections 21 having apertures therein to receive the adjacent ends of the tie rod, and nuts 22 threaded upon the said rod ends will securely tie the skeins tightly upon the axle tree 5.

From the foregoing it will be obvious that I have provided skeins for use in connection with wagons, carriages and the like, of comparatively simple construction, which enable the same to be quickly adapted to boxings of wheels of various sizes within moderate limits, compensate for wear, and the mechanism of the skeins is of such makeup or construction as to minimize the opportunity for wear, breakage, or derangement. The above is a description of the invention in its preferred form, but it is to be understood that the invention is not to be limited to this description and illustration, as variations in the construction, shape, assemblage, etc., of the various parts may be resorted to liberally without departing from the invention as defined by the claims.

What is claimed is:

1. In an adjustable wagon skein, a body adapted to be attached to the axle tree, a frame carried by said axle tree, and means for increasing or diminishing the diameter of said frame.

2. In an adjustable skein for wagons, a frame to enter the boxing of the wagon wheel, and means within the frame for expanding or retracting the latter to conform to the size of the boxing.

3. In an adjustable wagon skein, a stem carried by the axle tree, a frame inclosing said stem, members upon said stem adjustable longitudinally thereof and toward or away from each other, and arms connecting said adjustable members with said frame.

4. In an adjustable wagon skein, a stem, a frame including a plurality of independent plates inclosing said stem, members arranged upon said stem and adjustable toward and away from each other, and arms connecting said members with the plates of said frame.

5. In an adjustable wagon skein, a bolt, nuts arranged in pairs upon said bolt and capable of moving toward and away from each other, a frame inclosing said bolt and comprising a plurality of members independent of each other, and arms connecting the nuts of each pair with the various plates.

6. In an adjustable wagon skein, a body, a flange at one end of said body, a bolt carried by said body and extending outwardly therefrom, a plurality of plates, grooves on the inner ends of said plates receiving said flange, nuts arranged in pairs upon said bolt and movable toward and away from each other, and arms connecting said plates with said bolts.

7. In an adjustable wagon skein, a body, a bolt carried by said body, plates arranged in spaced relation around said bolt and resting at their inner ends upon said body, adjustable members upon said bolt, arms connecting said plates with said adjustable members, washers of various sizes adaptable to the outer end of said bolt, and means for holding said washers upon said bolt.

In testimony whereof, I affix my signature, in the presence of two witnesses.

PAUL STEWART.

Witnesses:
  DAN C. JACKLER,
  M. KUFIAP.